United States Patent [19]
Labart et al.

[11] 3,733,530
[45] May 15, 1973

[54] RADIO CONTROLLED MOTOR DRIVEN BUCKING STRAP

[76] Inventors: Melvin M. Labart, Myrtle Point Route, Box 8, Broadbent, Oreg. 97414; Lew Blanksma, 714 Ash St., Myrtle Point, Oreg. 97458

[22] Filed: Aug. 13, 1971

[21] Appl. No.: 171,514

[52] U.S. Cl. .......................... 318/16, 119/29, 54/1, 54/69
[51] Int. Cl. ............................................. H02p 1/00
[58] Field of Search ...................... 318/16; 119/29; 54/1, 69

[56] References Cited
UNITED STATES PATENTS

| | | |
|---|---|---|
| 3,505,979 | 4/1970 | Rosswag ............................ 119/29 X |
| 3,616,595 | 11/1971 | Townsend ........................... 54/1 |
| 2,608,812 | 9/1952 | Huchings ........................... 54/1 X |
| 3,215,912 | 11/1965 | Bruno ................................. 318/16 |
| 594,859 | 12/1897 | Clarkson ............................ 54/69 |
| 1,129,567 | 2/1915 | Griffeth .............................. 54/69 |

*Primary Examiner*—T. E. Lynch
*Attorney*—Lee R. Schermerhorn

[57] ABSTRACT

A bucking strap is equipped with a radio-controlled latch device enabling a rodeo official in the judging stand to release the bucking strap when a contestant has ridden a bucking horse or Brahma bull for a specified interval of time. The placing of the strap on the animal energizes a radio receiver in the device and operates a motor driven latch mechanism to close the latch. When a radio signal is received, it reverses the motor to release the latch and allow the bucking strap to fall off the animal.

7 Claims, 5 Drawing Figures

PATENTED MAY 15 1973
3,733,530
SHEET 1 OF 2
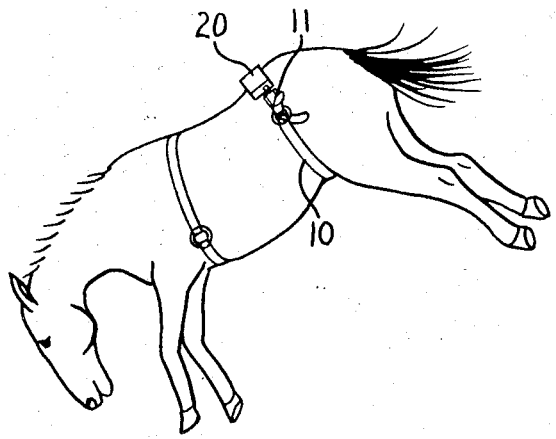
Fig_1
Fig_2
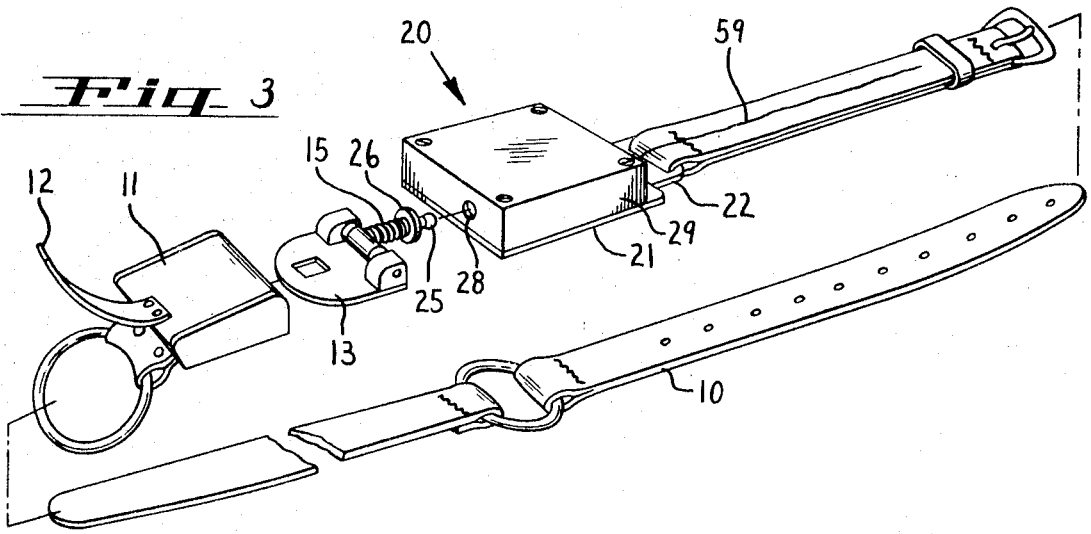
Fig_3
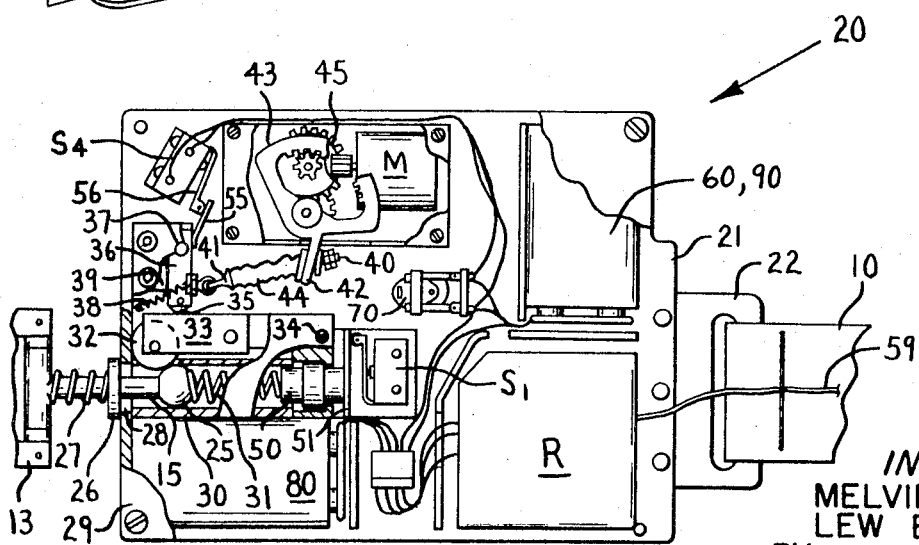
Fig_4
INVENTORS
MELVIN M. LABART
LEW BLANKSMA
BY Lee R. Schermerhorn
Attorney

RADIO CONTROLLED MOTOR DRIVEN BUCKING STRAP

BACKGROUND OF THE INVENTION

This invention relates to a bucking strap having a latch mechanism releasable by a radio signal.

In rodeo bucking contests a horse or Brahma bull is caused to buck more actively by applying a bucking or flank strap to the animal. A manually operable quick release latch is conventionally provided but if the rider is thrown off before he releases the bucking strap, the animal will continue to buck and kick until an attendant can rid alongside and release it. In the meantime, the fallen rider may be in danger from the excited animal. Also, it is desirable to release the strap as soon as the specified time interval has expired, regardless of whether or not the rider has been thrown off, in order to avoid prolonged and unnecessary annoyance to the animal.

Further, in training bucking animals it would be desirable to be able to release the bucking strap promptly at the end of a measured time interval so that the animal would become accustomed to expect relief at a definite time.

Objects of the invention are, therefore, to provide an improved bucking strap, to provide a bucking strap having a novel latch mechanism releasable by a radio signal, to provide an improved latch mechanism, to provide a latch mechanism wherein the mere joining together of two separable parts operates a motor to secure the latch and energizes a radio receiver in preparation for the subsequent release of the latch, and to provide a latch mechanism suitable for operation by either electric motor or spring would timer.

SUMMARY OF THE INVENTION

In the present construction the insertion of the latch bolt closes switches to energize a radio receiver and operate a motor-driven mechanism to secure the bolt. When a radio signal is received, the motor is operated in reverse to release the bolt and allow the bucking strap to fall free to the animal. As the bolt leaves the latch device, the radio receiver is deenergized. Thus, the radio remains energized only from the time the bucking strap is applied to the animal until it is released by radio a few minutes after the animal and rider leave the starting chute.

The release of the bucking strap in this manner reduces the danger of injury to the rider when he is thrown off or attempts to dismount after his ride. It also reduces the danger of injury to the pickup men and their mounts as they pick up the rider off the bucking animal. As soon as the animal is free of the rider and bucking strap, he quits bucking and kicking and becomes quiet.

By reducing the time of exposure of the animal to the bucking strap, these rodeo events will be easier on the animals and it is believed that this will prolong the number of years that a good bucking horse can be used.

The invention will be better understood and additional objects and advantages will become apparent from the following description of the preferred embodiment illustrated in the accompanying drawings. Various changes may be made in the details of construction and arrangement of parts and certain features may be used without others. All such modifications within the scope of the appended claims are included in the invention. Although illustrated in connection with a bucking strap, the present latch device is of general application for various purposes.

BRIEF DESCRIPTION OF THE DRAWINGS

FIG. 1 shows a bucking strap embodying the invention applied to an animal;

FIG. 2 is a view of a radio transmitter used to release the bucking strap;

FIG. 3 is a perspective view of the bucking strap;

FIG. 4 is a plan view of the latch mechanism and radio receiver with parts broken away.

DESCRIPTION OF THE PREFERRED EMBODIMENT

Figure 5:
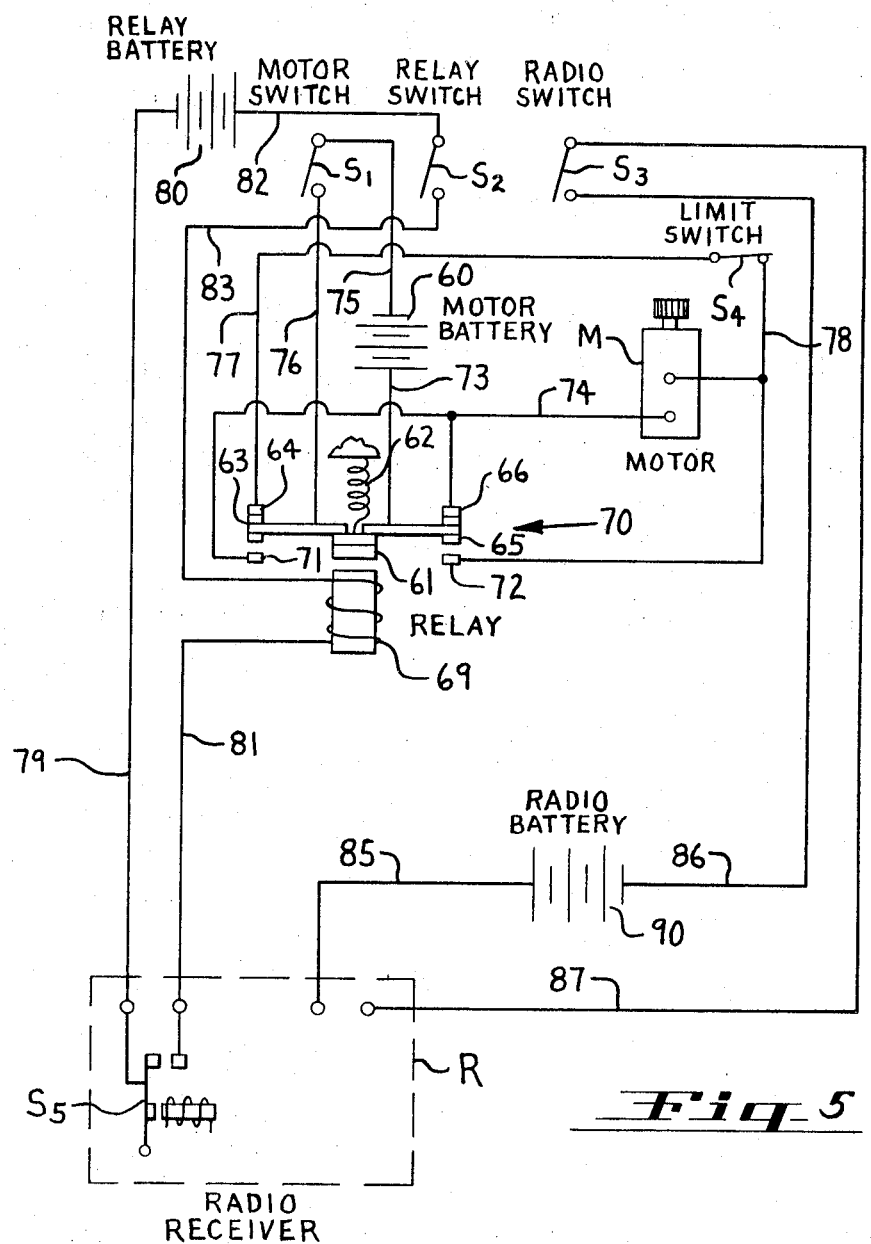
FIG. 5 is a wiring diagram of the electrical system.

The bucking or flank strap 10 is secured at one end to a conventional manual quick release device 11. Pulling outward on a thong 12 releases an apertured plate 13 which is normally connected with the opposite end of the strap 10. In the present construction the plate 13 is connected with a bolt 15 which is secured in a novel latch device 20 embodying the invention. The device 20 includes a base plate 21 having a slotted plate 22 to receive the said opposite end of strap 10.

The conventional release device 11 cannot be released by a small and compact radio-controlled mechanism because too much force must be applied to thong 12 when the strap 10 is under heavy tension about the animal. The conventional release 11 is not essential when the present new device 20 is used but it may sometimes be desirable to have the manual release available for use if needed.

Bolt 15 has a ball head 25 to retain a washer 26 which provides a spring seat for a compression spring 27 on the shank of the bolt. Head 25 will pass through an opening 28 in an end wall of the housing 29 of the device 20 while washer 26 does not pass through the opening 28 and causes spring 27 to be compressed when the bolt is thrust into the opening 28. Housing 29 is of sturdy crush-proof construction and is contained in a well padded leather pouch, not shown, to protect the internal components from damage.

Head 25 is received in a cylindrical guide tube 30 containing a compression spring 31. In latched position as shown in FIG. 4, the head 25 is retained in tube 30 by a latch roller 32 on the end of latch arm 33 which is pivotally mounted at 34 on the base plate 21. Arm 33 is held in latched position by a roller 35 in the end of a perpendicular arm 36 which is pivotally mounted on a pin 37 in base plate 21.

Arm 36 is tensioned in clockwise direction by a spring 38 and the arm engages a stop 39 when it is perpendicular to arm 33. Arm 36 may be rotated counterclockwise to release the latch by a link 40. The left end 41 of link 40 is pivotally connected to arm 36 and the right end extends through an apertured ear 42 on a sector gear 43. A resilient rubber tube 44 on the link 40 forms a compression spring and thrust member between the link end 41 and ear 42.

Sector gear 43 is driven through a gear train 45 from a reversible electric motor M. A short travel of roller 35 to the right releases arm 33 for upward movement withdrawing latch roller 32 from locking engagement behind the head 25 of bolt 15. Then the tension on belt 10 plus the force of compressed springs 27 and 31 rapidly eject the bolt from tube 30 allowing the bucking strap to fall off the animal. The arrangement of arms 33 and 36 and rollers 32 and 35 provides a low friction release mechanism which is operable by a small dry cell powered motor even though the belt 10 may be under heavy tension. This release mechanism is also adapted for release by a spring timer for training purposes as mentioned above.

The inner end of spring 31 is connected with a plunger 50 which is mounted for a limited range of sliding movement at the inner end of tube 30. Plunger 50 has an outer end bearing against a movable plate 51 which bears against the actuating roller arms of the three switches $S_1$, $S_2$ and $S_3$ in FIG. 5. These switches are mounted one above the other whereby only the top switch $S_1$ appears in FIG. 4. These switches are normally open by self-contained springs and are closed by the superior force by spring 31 when bolt 15 is inserted in tube 30 as shown. The three switches open their respective circuits when the bolt is ejected.

An oblique arm 55 on arm 36 bears against a roller on the end of an actuating arm 56 on the switch $S_4$. This switch is normally closed and is opened by the movement of arm 36 to latched position as shown in FIG. 4. The closing of switch $S_1$ by spring 31 when bolt 15 is inserted energizes the motor M for rotation in a direction to rotate sector gear 43 and arm 36 clockwise to latched positions as shown. This motion is transmitted from ear 42 to the arm 36 by rubber tube 44 which acts as a resilient thrust abutment on link 40, pressing arm 36 against its stop 39. A radio signal received in receiver R causes motor M to rotate in the opposite sirection to release bolt 15 as above described. Radio receiver R has a suitable antenna such as wire 59 trained a short distance along the strap 10.

The circuits for performing the above described functions are shown in the wiring diagram in FIG. 5. As previously mentioned, the insertion of bolt 15 closes switches $S_1$, $S_2$ and $S_3$. The closing of motor switch $S_1$ energizes motor M from battery 60. This circuit involves a double pole, double throw magnetic relay reversing switch 70. The relay has an armature 61 which is normally held in the upper position as shown, by a spring 62. In this position a contact arm 63 engages an upper contact 64 and a contact arm 65 engages an upper contact 66. Relay 70 further includes a solenoid coil 69 and lower contacts 71 and 72.

The closing of motor switch $S_1$ makes a circuit through battery wire 73, relay arm 65, contact 66 and wire 74 to one armature brush connection, through battery wire 75, switch $S_1$, wire 76, relay arm 63, contact 64, wire 77, closed limit switch $S_4$ and wire 78 to the other armature brush connection. This rotation of motor M rotates ear 42 and arm 36 clockwise until arm 36 engages stop 39. Just before the movement of arm 36 is stopped, the arm 55 opens limit switch $S_4$ to deenergize the motor. Overrun after the motor is deenergized is taken up by the compression of rubber tube 44 which thus presses the arm 36 firmly against stop 39, the gear train 44 being irreversible by the magnitude of the reaction of the compressed tube 44 against the ear 42.

The closing of relay coil switch $S_2$ by the insertion of bolt 15 has no effect at this time because radio receiver relay switch $S_5$ is open. One contact of switch $S_5$ is connected through battery wire 79 to relay battery 80 and the other contact of switch $S_5$ is connected to relay solenoid coil wire 81. A battery wire 82 connects with switch $S_2$ and a wire 83 connects this switch with relay solenoid coil 69.

The closing of radio switch $S_3$ by bolt 15 energizes radio receiver R through wires 85, 86 and 87 and radio battery 90.

The bucking strap is placed on the animal and bolt 15 is inserted in tube 30 as above described just before the animal and rider leave the starting chute. As soon as the animal leaves the starting chute it starts bucking and kicking because of the presence of the rider and the annoyance of the bucking or flank strap. If the rider falls off before the end of the time period established by the rules of the rodeo, one of the rodeo officials releases the bucking strap immediately by transmitting a signal from the single channel portable radio transmitter T in FIG. 2 and, being relieved of both rider and flank strap, the animal stops bucking and kicking. Thus, the rider is not endangered as he picks himself up and removes himself from the area.

If the rider succeeds in staying on the animal until the established time period has elapsed, the rodeo official will then operate the transmitter T to send a signal to the receiver R on the bucking strap. This causes the bucking strap to fall free of the animal and the pickup men ride out and assist the contestant in dismounting. Being relieved of the flank strap, the animal is less excited and violent and the contestant as well as the pickup men are exposed to less danger of injury.

The receiver R responds to the signal from transmitter T by closing relay switch $S_5$ to energize relay solenoid coil 69 and pull armature 61 downward, engaging relay arm 63 with lower contact 71 and engaging arm 65 with lower contact 72. This establishes a new circuit to the armature brushes of motor M with reversed polarity, causing the motor to rotate in reverse direction, it being remembered that limit switch $S_4$ is now open. Motor M preferably has permanent magnet field poles but any type of reversible motor may be used.

Reverse rotation of motor M rotates sector gear 43 and arm 36 counterclockwise, releasing bolt 15 as previously described and reclosing limit switch $S_4$, the latter performing no function at this time since its circuit is broken at contact 64. As bolt 15 leaves tube 30, spring 31 relaxes allowing the three switches $S_1$, $S_2$ and $S_3$ to re-open by their internal springs. The opening of switches $S_1$, $S_2$ and $S_3$ deenergizes motor M, deenergizes relay coil 69 and deenergizes the radio receiver R, returning the system to the condition illustrated in FIG. 5.

Having now described our invention and in what manner the same may be used, what we claim is new and desire to protect by Letters Patent is:

1. In a bucking strap, a housing connected to one end of said strap, a latch in said housing, a bolt connected to the opposite end of said strap and arranged for engagement by said latch to secure said strap and housing on an animal, a radio receiver in said housing, and means operable by said radio receiver to release said latch and allow said strap and housing to fall off the animal; said means including a reversible electric motor in said housing, said motor being operable in one direction to close said latch and operable in reverse direction to release said latch, switch and circuit means actuated by insertion of said bolt in said housing to operate said motor in said one direction to close said latch, and switch and circuit means actuated by said radio receiver to operate said motor in said reverse direction to release said latch; and switch and circuit means in said housing actuated by said insertion of said bolt to energize said radio receiver.

2. A bucking strap as defined in claim 1 including a reversing switch for said motor in said housing actuated by said radio receiver.

3. A latch mechanism comprising a bolt having a shank portion with a head on one end thereof, a housing having guide means receiving said bolt, a latch roller movable laterally toward and away from said bolt arranged to project behind said head and latch said bolt in said guide means, a movable member arranged to hold said latch roller in latched position, a reversible electric motor operable on said movable member to withdraw said member from a position holding said latch roller in latched position, to release said bolt, and switch and circuit means actuated by insertion of said bolt in said guide means to operate said motor in one direction to latch said bolt.

4. A latch mechanism as defined in claim 3, said latch roller being mounted on a pivotal arm extending parallel with said guide means, and said movable member comprising a pivotal arm perpendicular to said latch roller arm and having a roller engaging said latch roller arm.

5. A latch mechanism as defined in claim 3 including a spring arranged to eject said bolt from said guide means when said bolt is unlatched.

6. A latch mechanism as defined in claim 3 including a radio receiver in said housing, and switch and circuit means actuated by said radio receiver to operate said motor in reverse direction to unlatch said bolt.

7. A latch mechanism as defined in claim 6 including switch and circuit means in said housing actuated by said insertion of said bolt to energize said radio receiver.

* * * * *